June 1, 1943.  A. Z. BENDAR  2,320,505
FLIGHT POSITION AND FORCE INDICATING INSTRUMENT
Filed May 24, 1941   3 Sheets-Sheet 1
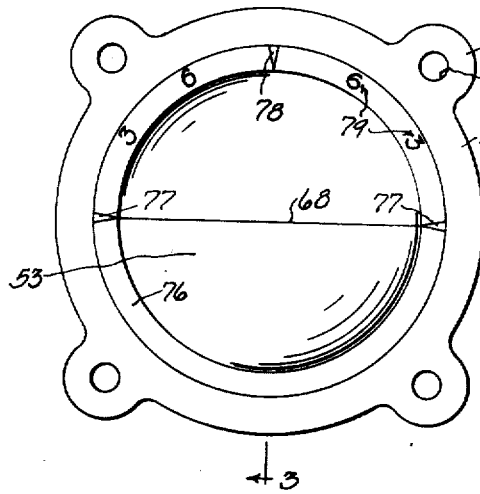
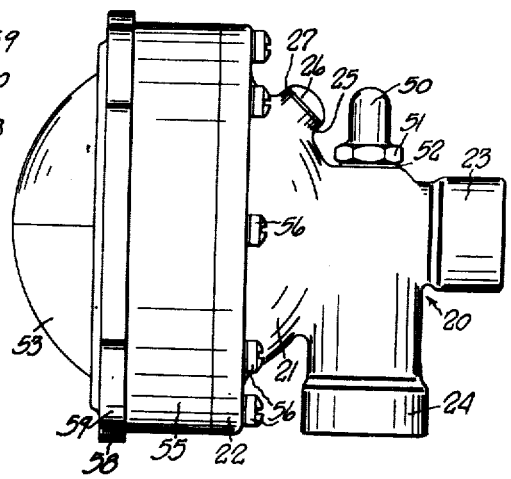
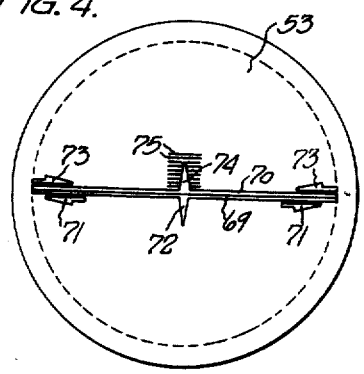
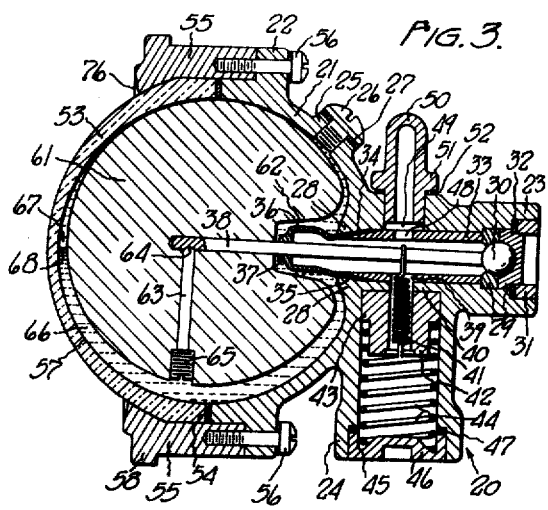
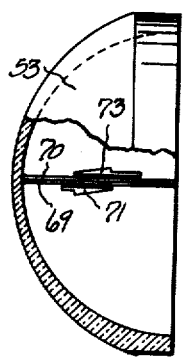
INVENTOR.
ARTHUR Z. BENDAR.
BY Oltsch & Knoblock
Attorneys.

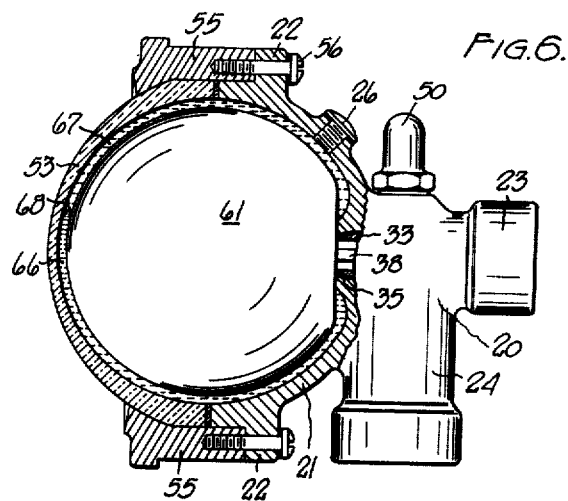
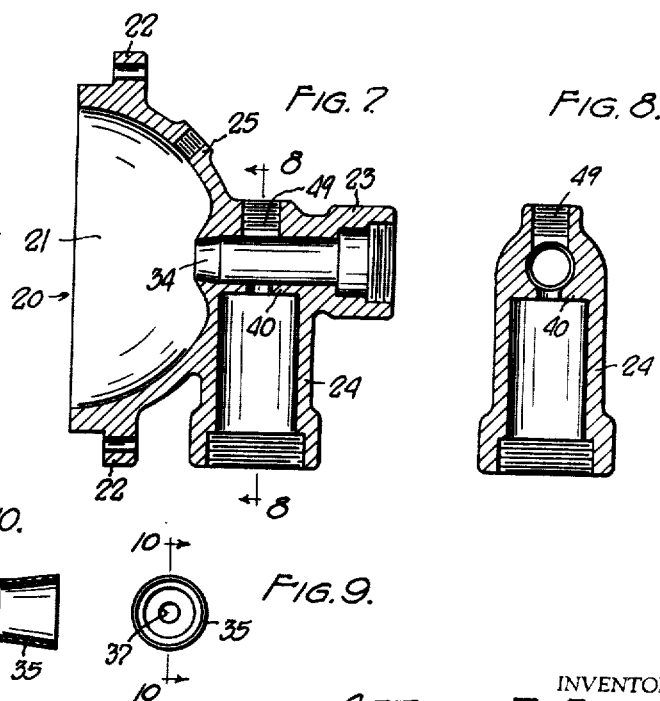

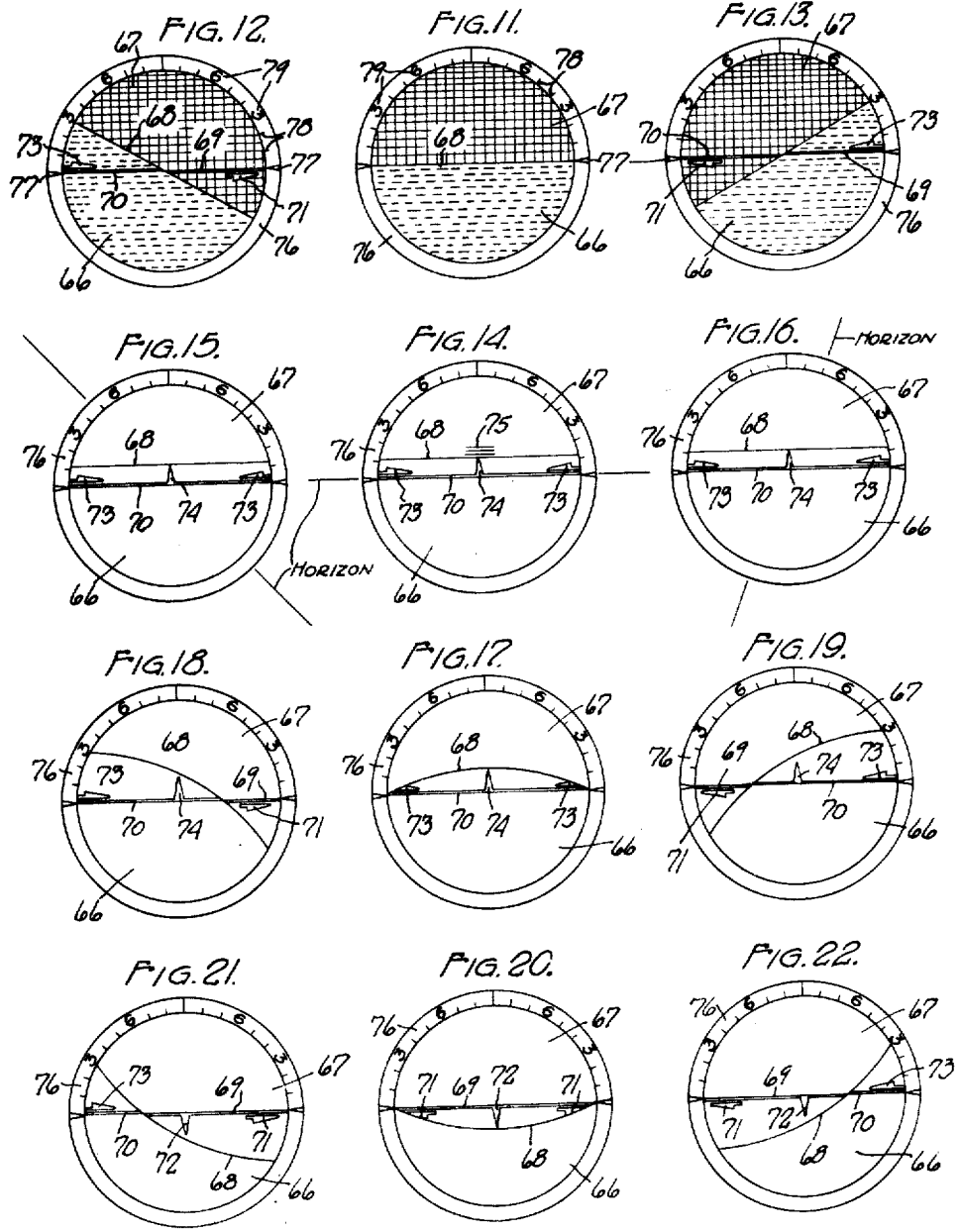

Patented June 1, 1943

2,320,505

UNITED STATES PATENT OFFICE 2,320,505

FLIGHT POSITION AND FORCE INDICATING INSTRUMENT

Arthur Z. Bendar, Ingleside, Ill.

Application May 24, 1941, Serial No. 394,967

28 Claims. (Cl. 264—1)

This invention relates to a flight position and force indicating instrument for aircraft.

The primary object of this invention is to provide an instrument for indicating the position of an aircraft in flight and for indicating the forces acting upon the craft incident to a change in direction of flight, a spin, acrobatics, etc.

A further object is to provide a device of this character utilizing liquids for indication of flight position and force, wherein two liquids of different specific gravities are employed in a manner to afford complete compensation for expansion and contraction, and to modulate the action of the instrument in all indicating conditions and positions thereof.

A further object is to provide a device of this character which gives a clear indication of the nature of any variation of the position of a craft from normal flight position, and of the correction or adjustment of the controls of the craft necessary to restore the craft to normal flight position.

A further object is to provide a device of this character which will indicate the following flight conditions: nose high and nose low positions, inclined wing positions, improper turns, relation of applied stresses to the maximum stress limit of the craft, rate of climb, and sudden updrafts.

A further object is to provide a device of this character which will indicate the forces exerted upon a craft in making right and left turns, in pulling out of a dive, in rapid climbs incident to sudden updrafts, and incident to various manipulations and maneuverings of a craft in acrobatic or stunt flying.

A further object is to provide a device of this character which is novel, simple, and inexpensive in construction, which is easy to install, and which is self-contained.

A further object is to provide a device of this character having a liquid chamber containing two liquids, each of a given and distinguishing color, and of different specific gravities, together with a liquid displacement member of a specific gravity lower than that of at least the heaviest of the two liquids, wherein said displacement member is mounted for movement transverse of the plane or level of separation between the two liquids.

A further object is to provide a device of this character having a liquid containing chamber provided with a transparent portion and containing quantities of two liquids of different specific gravities and of contrasting colors, wherein said transparent member carries markings of the same color as said liquids and positioned adjacent the plane of separation of said liquids, whereby the markings are normally invisible, but are subject to exposure against the background of the liquid of contrasting color upon a change in the position of the chamber and its transparent portion.

A further object is to provide a device having a liquid containing chamber receiving a buoyant liquid displacement sphere, and means mounting said sphere to modulate the action thereof incident to the application of centrifugal force to the device.

A further object is to provide a device of this character having a liquid containing chamber receiving a buoyant liquid displacement sphere, a weight yieldably connected with said sphere, and yieldable means normally counterbalancing said weight.

A further object is to provide a device utilizing the level of a liquid for indication of the flight position of an aircraft, and provided with means correcting for temperature variations to which the device may be subject in flight.

Other objects will be apparent from the description, drawings, and appended claims.

In the drawings:

Fig. 1 is a face view of the instrument.

Fig. 2 is a view of the instrument in side elevation.

Fig. 3 is a longitudinal vertical sectional view taken on line 3—3 of Fig. 1.

Fig. 4 is a face view of the crystal of the instrument.

Fig. 5 is a side view of the crystal of the instrument with parts shown in section.

Fig. 6 is a side view of the instrument with parts shown in section to illustrate the positions of the liquids when the instrument is indicating the application of force to the craft.

Fig. 7 is a longitudinal vertical sectional view of the frame of the instrument taken on line 3—3 of Fig. 1.

Fig. 8 is a transverse vertical sectional view of the instrument taken on line 8—8 of Fig. 7.

Fig. 9 is an end view of the rubber sealing sleeve of the instrument.

Fig. 10 is a longitudinal sectional view of the sleeve taken on line 10—10 of Fig. 9.

Figs. 11 to 22, inclusive, are diagrammatic views of the instrument illustrating the various indications which may be obtained therefrom as the same appear to the pilot of a craft when the instrument is mounted upon the instrument panel of the craft.

Fig. 23 is a diagrammatic view of the path of flight of an aircraft illustrating a dive and recovery.

Referring to the drawings, which illustrate the preferred embodiment of the invention, the numeral 20 designates the frame of the instrument which is preferably formed of metal and may constitute a die casting. Frame 20 comprises a substantially semi-spherical concave-convex portion 21 whose concave face is substantially semi-spherical. Portion 21 has an annular flange 22 adjacent its outer edge. A generally cylindrical frame part 23 projects from the center of portion 21 with its axis preferably perpendicular to the plane of the outer edge of the semi-spherical portion 21, and has a bore extending longitudinally therethrough. A generally cylindrical portion 24 projects downwardly from portion 23, and its axis is perpendicular to the axis of portion 23. Portion 24 has an apertured longitudinal bore communicating with the bore of portion 23. The semi-spherical frame portion 21 has an enlargement 25 receiving a screw 26 whose head seats upon a sealing gasket 27. The aperture in portion 25 constitutes a liquid filling opening for the device.

The bore of cylindrical portion 23 communicates with the concavity of the portion 21 and is of restricted tapered form adjacent its inner end to provide an annular shoulder 28 for purposes to be hereinafter described. The outer end of the bore of cylindrical frame part 23 is of enlarged step formation to receive a split bearing 29 providing a universal joint mounting for a sphere 30, and to receive an annular screw-threaded retaining nut 31 pressing against a sealing gasket 32 and against the outer bearing 29. A tubular member 33 fits snugly within the bore of the cylindrical portion 23 and is tapered at 34 substantially complementary to the taper of the bore of frame part 23. A flexible member preferably formed from oil resistant, flexible, sealing material, in the nature of artificial rubber, such as "Neoprene" or the like, has an annular skirt portion 35 clamped between the tapered portion 34 of sleeve 33 and the tapered portion of the bore of frame part 23. The sealing member has a tubular portion 36 projecting forwardly from skirt 35 into the concavity of the spherical frame portion 21, and terminates in a small diameter collar portion 37. An elongated rod 38, of a diameter much smaller than the inner diameters of tube 33, and sealing sleeve portion 36, is varied by sphere 30 and extends longitudinally and freely through the tube 33 and the sealing tube 35—36—37 and projects forwardly beyond the plane of the outer edge of the semi-spherical frame portion 21. The collar portion 37 of the sealing tube is of a size to fit snugly or constrictively about the elongated rod 38.

Sleeve 33 has an opening 39 therein coaxial with the bore of cylindrical frame portion 24 which registers with a complementary opening in a closure plate portion 40 formed at the upper end of cylindrical portion 24. An elongated coil spring 41 passes through the aperture in wall 40 and the aperture 39 for connection at its upper end with the rod 38. At its lower end, coil spring 41 mounts a weight 42 whose diameter is less than the diameter of the bore of the portion 24 for the major portion of its length, and which has an enlarged diameter portion 43 adjacent its upper end fitting snugly but slidably in the bore of portion 24. A coil spring 44 fits within the bore of portion 24 around the lower end of weight 42 to bear against the enlarged portion 43 thereof at its upper end. The lower end of spring 44 is supported in an annular groove 45 in the inner face of a closure plate 46 screw threaded in the enlarged outer end of the bore of portion 24 and pressing against a suitable annular gasket 47 for sealing the parts.

In diametrically opposed relation to opening 39 the tube 33 is provided with an aperture 48 which communicates with an enlarged screw threaded bore 49 in frame portion 23. The open end of an elongated hollow or chambered member 50, which is closed at its outer end is threaded in bore 49. Member 50 includes an enlarged hexagonal nut portion 51 which seats against an annular sealing gasket 52.

A substantially semi-spherical concave-convex, transparent crystal or glass 53 has its edges bearing against annular gasket 54 at the outer edge of frame portion 21. Crystal 53 is held to place by a bezel ring 55 fitting therearound and also around the front end portion of the semi-spherical frame portion 21. Bezel 55 terminates adjacent the annular flange 22 of frame 20 and is secured thereto by screws 56 passing through flange 22 and into a rear edge of the bezel 55. The interior radius of the crystal 53 is the same as the interior radius of the semi-spherical frame portion 21. Thus, when said parts are interconnected by bezel 55, a substantially spherical cavity 57 is provided which has a fluid tight seal at the junction of the parts by virtue of the compressed annular gasket 54 between the parts. The bezel 55 is preferably provided with an enlarged mounting flange 58 adjacent its outer end from which project ears 59 apertured at 60 to receive securing means for attachment of the instrument to an instrument panel.

Within the spherical cavity 57 of the instrument is positioned a sphere 61 of a radius slightly smaller than the radius of the spherical chamber 57. Thus, if the spherical chamber 57 is 2⅜ inches in diameter, sphere 61 will preferably be approximately 2¼ inches in diameter. As here shown, sphere 61 is solid and is radially recessed at 62 for the free reception of the sealing tube 36—37. It will be understood, however, that sphere 61 may be hollow if preferred or necessary. Sphere 61 is provided with a radial bore coaxial with recess 62 in which the elongated rod 38 fits snugly. Sphere 61 is provided with another bore substantially perpendicular to the bore receiving rod 38 in which is mounted an elongated retainer rod 63 having a pointed end 64 fitting in a recess in the rod 38 and having enlarged screw threaded portion 65 for holding the retainer 63 in place. The space between the walls of spherical chamber 57 and sphere 61 is filled with a quantity of mercury 66 or other liquid having a high specific gravity and a distinguishing color, and a quantity of a viscous liquid 67, such as dark colored oil, having a specific gravity substantially less than and of a color contrasting to that of the mercury or other liquid 66. These two liquids preferably completely fill the space between the sphere 61 and the walls of spherical chamber 57. The sphere 61 is formed of any material, such as Celluloid, wood, synthetic resin, or the like, which has a specific gravity less than the specific gravity of the mercury or other liquid 66, and also preferably less than the specific gravity of the oil 67. Hence, the sphere 61 will normally be positioned eccentrically of the spherical chamber 57, i. e. at the upper end thereof. The relative quantities of mercury 66 and oil 67 which are employed are preferably such that when the sphere 61 is in this normal eccentric position, the plane 68 of separation between the liquids 66 and 67 will coincide with the horizontal center plane of the spherical chamber 57. In view of the proportions of the parts set out above as illustrative, the liquid 66 will comprise approximately 75% of the total amount of the two liquids.

The crystal 53 has suitably applied thereto preferably at its concave or inner face, a linear marking 69 extending thereacross with its upper edge coinciding with the plane of separation of the liquids 66 and 67. Marking 69 is of the same color as the mercury or other liquid 66, so that it blends with the mercury and cannot be discerned from the mercury when the instrument is in its normal position. Crystal 53 is provided with a second linear mark 70 extending thereacross and longitudinally engaging the mark 69. Mark 70 is of the same color as the oil or other liquid 67 whereby it cannot be discerned from said oil when the instrument is in normal position. Adjacent and below the opposite ends of the mark 69 are applied a pair of oppositely outwardly pointing arrow-shaped marks 71 of the same color as the mercury. At the center of the crystal is formed a downwardly pointing arrow 72 projecting from line 69 and also of the same color as the mercury. In adjacent parallel relation to and above the opposite ends of the line 70 are applied opposite inwardly pointing arrow 73 of the same color as the oil 67, and at the center of the crystal and projecting above the line 70 is formed an upwardly pointing arrow-shaped mark 74 of the same color as the oil. Also, if desired, there may be applied to the crystal 53 above the line 70 a plurality of spaced horizontal marks or lines 75 of the same color as the oil and adjacent the arrow 74, for purposes to be hereinafter set forth.

The forward edge 76 of the bezel 55 is preferably provided with a pair of horizontally opposed indicia pointers 77 positioned to coincide with the normal plane 68 of separation of the liquids 66 and 67. Bezel face 75 is also provided with a plurality of angle indicating lines 78 and numerals 79 displaced 30 and 60 degrees from the indicia 77.

Referring to Fig. 3, which illustrates the normal position of the parts of the device, it will be observed that the sphere 61, by reason of its buoyancy is normally positioned at the top of the spherical chamber 57. Rod 38 extends at an angle relative to the horizontal, but has a clearance with the tube 33 through which it passes. The rubber sleeve 35—36—37 seals the liquid containing spherical chamber 57 from the tube 33, and by virtue of its flexibility, accommodates the angular position of the rod 38 and variations of said position, without applying any restraining stress upon said rod or upon the sphere 61.

The amount of mercury 66 employed in the device is just adequate to extend to the horizontal center plane of the spherical chamber 57 when the sphere 61 is in said upwardly off-set position, and a much smaller quantity of the oil or other liquid 67 is required to fill the remainder of the space in the spherical chamber. Hence, when the aircraft is subjected to any stress having a component of centrifugal force, as along the parts a, b, c, of the path of flight illustrated in Fig. 23, that centrifugal force tends to shift the sphere 61 toward the central and lower portion of the chamber 57. Such movement of sphere 61 displaces the mercury 66, and raises the level of the plane 68 of separation between the liquids 66 and 67, as best illustrated in Figs. 6, 14, 15, 16. Hence, the instrument will indicate, by means of the raised level of the plane of separation 68 of the liquids, with relation to the lines 75 upon the crystal 53, the amount of force to which the craft is being subjected. In this connection, it will be obvious that the movement of the sphere 61 in the spherical chamber 57 will be proportional to the amount of centrifugal force applied, so that the marks or lines 75 may be calibrated to designate the amount of force or stress to which the craft when viewed with relation to the liquid level 68 is subject.

The centrifugal force to which the craft and the instrument are subjected also acts upon the weight 42. Weight 42 is normally fully counterbalanced by coil spring 44. Also, by reason of the mass of the weight in proportion to the much smaller mass or weight of the sphere 61, the coil spring 41 connecting the weight 42 with the rod 38 tends to overcome and compensate for the inertia action of the weight 42, and to accommodate a modulated and somewhat delayed action of the sphere 61 which necessarily occurs by reason of the necessity of moving the sphere 61 within the liquids 66 and 67. Therefore, the combination and arrangement of the parts, and particularly of the springs 41 and 44, is such that the response of the device prevents over travel of the sphere 61, and provides a quick return of parts to normal position as illustrated in Fig. 3, as soon as the centrifugal force has been relieved.

It will be understood that centrifugal force tends to multiply the effective weight of all parts of the device, while the compressive and expansive forces of the spring 41, and of counterbalancing spring 44, respectively, remain constant. Hence, a differential, proportional to the amount of the centrifugal force experienced, is set up between the normally counterbalanced weight 43 and spring 44, which permits the weight 43 to shift and to pull upon spring 41 and arm 38 to displace sphere 61 in the liquid containing chamber.

The provision of the flexible sealing sleeve with portion 36 thereof spaced from the rod 38 accommodates for variations in pressure and temperature tending to vary the volume of the liquids 66 or 67. Thus, for example, in the event of a temperature rise which will increase the volume of the liquid, and particularly the volume of the mercury, the expanded liquid will press inwardly against the sleeve 36 to cause the same to collapse or flex inwardly and radially and thus accommodate for the increased volume of the liquid without destroying the value of the sleeve as a seal or its flexibility. In the event of a decrease in temperature, the only result will be to lower the liquid level 68 which will serve to indicate to the pilot the temperature drop and hence permit him to make the necessary mental corrections of the instrument readings. Any change in the air pressure will have no substantial effect upon the instrument because of its sealed connection.

A liquid may be provided in the interior of tube 33 and in the bore of housing portion 24, to give a dash pot action upon movement of the weight. Such liquid will extend to approximately the level of the base of the fitting 50, so that an air pocket is provided within the fitting 50 to compensate for expansion of the liquid or changes in air pressure.

One of the primary purposes of the instrument is to indicate the position of the aircraft in flight; that is, to indicate any variation of the position of the craft from normal or level flight position, with respect to both the lateral and the longitudinal axes of the craft. The operation of the device to indicate various conditions of the craft in flight have been illustrated in Figs. 11 to 22, inclusive, which will be referred to specifically for the puropse of explaining the operation of the instrument and the indication obtained therefrom.

Fig. 11 illustrates the instrument as the same appears in normal flight. Note that only the line of separation of the two contrasting liquids at 68 is visible, and that this line extends between the indicia 77 on the bezel 76 of the device to designate a level flight condition.

Fig. 12 illustrates a flight condition with the left wing lowered so that the transverse axis of the plane is 30 degrees displaced from normal while the direction of flight is substantially straight. In this condition the liquid level line 68 is inclined with respect to the transverse as the instrument is viewed by the pilot, and points to the numeral 3 to designate a 30 degree angle of inclination. This tilting of the instrument relative to the horizontal exposes the right end of mark 69 and the left end of line 70 against the background of the liquids 67 and 66, respectively. Also, the left hand arrow 73 becomes apparent against the background of the mercury 66, and the mercury colored arrow 71 becomes apparent against the background of the oil 67. By virtue of the arrangement of the arrows 71 and 73, the two arrows which are exposed in the condition of flight illustrated in Fig. 12 point in the same direction, namely, to the right, to indicate the direction in which the control stick of the craft should be moved for the purpose of restoring the craft to normal flight with its transverse axis in a horizontal position.

Fig. 13 illustrates a condition wherein the right wing is low, and which is the opposite of the condition illustrated in Fig. 12. The right end of line 70, the left end of line 69, the left arrow 71 and the right arrow 73 are exposed to view against the background of the liquid of contrasting color; hence 69—70 designates the angle of inclination and the arrows point to the left to indicate that a movement of the stick to the left is required to restore the craft to normal flight.

Fig. 14 designates the appearance of the instrument when the same is indicating a force or stress condition only, as when the aircraft is entering or pulling out of a dive. Note that the liquid level 68 has been raised. When level 68 is read with respect to the calibrated indicia 75, it indicates the amount of the force or stress to which the craft is being subjected. Also, it will be noted that the line 70 and the arrows 73 of the color of the oil 67 become apparent against the background of the mercury 66, as does also the arrow 74. Hence, when the instrument appears as illustrated in Fig. 14, the pilot is informed of the fact that his ship is out of longitudinal balance and is being subjected to centrifugal or other force or stress. The exposure of the arrow 74 indicates to the pilot that it is necessary for him to bring the ship into longitudinal balance, while the parallel relation of liquid level 68 to line 70 indicates that the lateral axis of the plane is normal.

Fig. 15 illustrates the reading of the instrument when the left wing of the plane is low and the plane is being subjected to stress. Note that the level of the plane 68 has been raised to expose the lines 70 and the arrows 73 and 74, and that said plane 68 is substantially parallel to the line 70 so that the reading is the same as in Fig. 14, namely, one which indicates force only, if the craft is banked the amount required for the turn which occasions the centrifugal force. When the stick is pushed forward, as indicated by the arrow 74, the instrument will give a reading similar to Fig. 12. The same condition exists when the right wing is low, as illustrated in Fig. 16. Thus, though the instrument indicates both the flight position and the application of force thereto, the readings are not obtained simultaneously in most instances, since the force indication may blank out the position indication initially, so that the position indication is obtained only after the force applying condition is corrected. It may also be mentioned that, during a loop or a roll, the positions of the two liquids will continually change in a single direction, as will be obvious and observance of the movement and its direction will indicate the nature of the maneuver to the pilot.

Fig. 17 illustrates the indication given by the instrument when the aircraft is in a straight climb or nose high position. The line 68 of separation between the liquids has become curved in form and extends between indicia 77 of the bezel 67 to expose substantially the full length of line 70, the inner portions of arrows 73, and at least a portion of arrow 74, all of which are all the same color as the oil 67 and appear against the contrasting background of the mercury 66. This informs the pilot that he must push forward on the stick to return the craft to longitudinal balance.

Fig. 18 indicates a condition wherein the plane is in a climb with the left wing low. The liquid level line 68 is curved and points to the number 3 at the left to give a reading of the extent of lateral inclination of the craft. The left part of line 70 and the right part of line 69 are exposed, together with the left arrow 73 and the right arrow 71, which indicate that a movement of the stick to the right, in addition to a forward movement thereof, is required to restore the plane to normal flight.

Fig. 19 indicates the reading given by the instrument when the craft is in a climb or nose high position with its right wing low.

Fig. 20 illustrates the appearance of the instrument when the craft is in a dive or nose low position, with the lateral axis of the plane in stable or horizontal position. The mercury colored line 69 is exposed by virtue of the downwardly curved form of the line 68 of separation between the liquids. The mercury colored arrows 71 and 72 are also exposed against the background of the dark colored oil 67. When this reading of the instrument is observed, the pilot is informed thereby that it is necessary for him to pull backwardly on the stick in order to restore the plane to normal flight.

Fig. 21 illustrates the appearance of the instrument when the plane is in diving or nose low position with its left wing low. The line 68 of separation of the liquids curves downwardly with its left end high and pointing to the indication upon the bezel 76 which constitutes a measurement of the degree of lateral displacement. At the same time, the right end portion of line 69 and the left end portion of line 70 are exposed, together with the left arrow 73, the right arrow 71, and the arrow 72. This reading of the instrument informs the pilot that it is necessary for him to move the stick backwardly and to the right in order to restore the craft to balance. Fig. 22 illustrates the appearance of the instrument when the plane is in a diving or nose low position with its right wing low.

It will be observed from the above that the instrument is simple in construction and operation and positive in its reading; indicates longitudinal and lateral unbalance of the plane; indicates stresses to which the plane is subjected, as when pulling out of a dive; affords a modulated action; has a very large surface contact between the liquid and the spherical chamber in proportion to the small volume of the liquid in the chamber; and serves fully the purposes of an artificial horizon and of a stress or force indicator.

It will be observed additionally that the simplicity of the instrument makes it comparatively inexpensive in cost. Still another important advantage is that the instrument does not require any ancillary attachment, in the nature of a Venturi tube or an air motor, as is necessary with conventional gyroscopic types of instruments such as artificial horizons.

It will be observed that the construction of the device, the functions, and results achieved thereby and the use of two liquids, one such as mercury being an electrical conductor, and the other such as oil being dielectric, renders the device readily adaptable for connection with automatic means for controlling the craft. Thus, by connecting the electrical circuit of the controlling means to the instant device by means of contacts positioned adjacent the plane of separation of the two liquids and at positions 90 degrees displaced with respect to each other any change in the position of the housing and contacts with respect to the horizontal will cause certain of the contacts projecting into the liquid containing chamber to be engaged or contacted by a liquid different from the liquid that normally contacts the same when the device is at a level flight position and will hence control the circuits to the automatic flight position control means.

It will be apparent that the contacts may be arranged either in closed circuit relation engaged by the mercury with the circuit to be opened upon variation in the liquid level, or may be of the open circuit type with the circuit to be closed upon engagement of the contacts and the mercury when the instrument is tilted.

I claim:

1. An aircraft instrument comprising a housing having a spherical chamber defined in part by a transparent member, said housing having an elongated rearwardly radially extending horizontal passage communicating with said chamber and a vertical passage whose upper end communicates with said first passage, a buoyant sphere in said chamber said sphere having a radius slightly smaller than said chamber, an elongated arm connected to said sphere and extending through said horizontal passage, means pivotally mounting the rear end of said arm in said passage, a weight shiftable in said vertical passage, a spring normally counterbalancing said weight, extensible means connecting said weight and an intermediate portion of said arm, two liquids of different specific gravities and contrasting colors filling the space in said chamber around said sphere, and a flexible sealing member adjacent the mouth of said horizontal passage.

2. An aircraft instrument comprising a housing having a spherical chamber defined in part by a transparent member, said housing having an elongated horizontal passage branching from said chamber and a downwardly extending passage branching from said horizontal passage, a buoyant sphere in said chamber, said sphere being smaller than said chamber, a rigid rod mounting said sphere at one end and extending through and pivotally mounted in said horizontal passage at its opposite end, a weight shiftable in said vertical passage, a spring normally counterbalancing said weight, means suspending said weight from an intermediate portion of said rod, a flexible sealing member spanning the inner end of said horizontal passage and having a sealed connection with said rod, and two liquids of contrasting colors and different specific gravities filling the space in said chambers around said sphere.

3. An aircraft instrument as defined in claim 2, including a liquid in said passages, and a chambered member communicating with and extending upwardly from said horizontal passage and above the level of the liquid therein.

4. An aircraft instrument as defined in claim 2, and marks on said transparent member adjacent to and above and below the plane of separation of said liquids when said instrument is in normal position, and each of said marks being of the same color as the liquid adjacent thereto, whereby said marks are normally invisible but become apparent against the background of the liquid of contrasting color when the position of the instrument varies from normal.

5. An aircraft instrument comprising a housing having a chamber therein defined in part by a transparent member, a buoyant member shiftable in said chamber, a weight shiftable in said housing and connected with said buoyant member to shift said member, a spring normally counterbalancing said weight, and two liquids of contrasting appearance and different specific gravities filling the space in said chamber around said buoyant member.

6. An aircraft instrument as defined in claim 5, and indicia on said transparent member for measuring changes in the level of the plane of separation of said liquids when said buoyant member shifts in said chamber.

7. An aircraft instrument comprising a housing having a chamber therein defined in part by a transparent member, a small quantity of each of two liquids of distinguishable colors and different specific gravities within said chamber, and means responsive to centrifugal force shiftably carried by said housing and including a buoyant member in said chamber of a size to be substantially completely immersed in said liquids and shiftable to and from centered relation in said chamber.

8. An aircraft instrument comprising a housing having a spherical chamber therein defined in part by a transparent member, a small quantity of a liquid of one color within said chamber, a sphere in said chamber of a radius slightly smaller than the radius of said chamber and adapted to float in said liquid, and a second liquid of a different color and of lower specific gravity than said first liquid substantially filling the space in said chamber around said sphere and above said first liquid and means mounting said sphere for movement to and from centered relation in said chamber incident to centrifugal force.

9. An aircraft instrument as defined in claim 8, wherein the volumes of said liquids are so proportioned that the plane of separation therebetween coincides with the center plane of said chamber when said sphere is in normal position.

10. An aircraft instrument as defined in claim 8, wherein said transparent member is of substantially semi-spherical concave-convex form.

11. An aircraft instrument comprising a housing having a chamber therein defined in part by a transparent member, a quantity of mercury in said chamber, a liquid displacement member shiftable in said chamber having a specific gravity less than mercury and a cubical dimension greater than one half the cubical dimension of said chamber centrifugally responsive means for shifting said member in said chamber transversely of the normal surface plane of said mercury, and a quantity of a liquid of a specific gravity less than mercury and distinguishable from mercury in appearance substantially filling the upper part of said chamber around said displacement member.

12. An aircraft instrument comprising a housing having a chamber therein defined in part by a transparent member, a liquid displacement member shiftable within said chamber, centrifugally responsive means for shifting said member to and from centered position within said chamber and two liquids of different colors and different specific gravities substantially filling said chamber and immersing said member, said member normally floating in said liquids.

13. An aircraft instrument comprising a housing having a chamber therein defined in part by a transparent member, a liquid displacement member shiftable within said chamber and mounted on an arm pivoted to said housing, and two liquids of different colors and different specific gravities substantially filling said chamber and immersing said member, said member normally floating in said liquids, and a normally counterbalanced weight shiftably carried by said housing and suspended from said arm.

14. An aircraft instrument comprising a housing having a chamber therein defined in part by a transparent member, a liquid displacement member shiftable within said chamber, and two liquids of different colors and different specific gravities substantially filling said chamber and immersing said member, said member normally floating in said liquids, a normally counterbalanced weight shiftably carried by said housing, and extensible means suspending said weight from said member.

15. A level indicating instrument comprising a housing, a transparent member carried by said housing and cooperating therewith to define a chamber, two liquids of different colors and different specific gravities in said chamber, at least one marking on said member immediately below the normal plane of separation of said liquids and of the same color as the heavy liquid, and at least one marking on said member immediately above the normal plane of liquid separation, and of the same color as the lighter liquid.

16. A level indicating instrument as defined in claim 15, wherein said chamber is spherical and said transparent member is of semi-spherical concave-convex form.

17. A level indicating instrument as defined in claim 15, wherein said transparent member is of concavo-convex form and said markings are elongated and extend in planes parallel to the normal plane of liquid separation.

18. A level indicating instrument as defined in claim 15, wherein said markings are elongated and extend in planes parallel to the normal plane of liquid separation.

19. An aircraft instrument comprising a housing having a chamber containing a quantity of liquid, a displacement member including a buoyant portion smaller than said chamber and normally floating in said liquid, a weight suspended from said member, and a spring normally counterbalancing said weight.

20. An aircraft instrument comprising a housing having a chamber containing a quantity of liquid, a displacement member including a buoyant portion smaller than said chamber and normally floating in said liquid, a weight suspended from said member, and a spring normally counterbalancing said weight, and means for indicating the extent of displacement of said member from a normal floating position.

21. An aircraft instrument comprising a housing, means shiftable in said housing about a center point to normally assume a constant position with relation to the horizon by gravity including a liquid, means acting upon said shiftable means and tending to displace said liquid and said center point, said last named means including a float, a weight connected with said float, and a spring normally counterbalancing said weight.

22. An aircraft instrument comprising a housing, a self-leveling instrumentality shiftable in said housing about a center point by gravity, and including a liquid, a weight-actuated instrumentality acting upon said first instrumentality to displace said liquid and said center point, and means exerting a substantially constant force on said last-named instrumentality to normally counterbalance the same.

23. An aircraft instrument comprising a mounting, a self-leveling instrumentality shiftable in said mounting about a center point by gravity including a liquid, means exerting a centrifugal variable force upon said instrumentality to displace said liquid and shift said center point in said mounting, and means exerting a substantially constant normally counterbalancing force upon said first-named means.

24. A level indicating instrument comprising a housing, a transparent member carried by said housing and cooperating therewith to define a chamber, two liquids of different colors and different specific gravities in said chamber, a plurality of markings on said member adjacent and below the normal plane of separation of said liquids and of the same color as said heavy liquid, and a plurality of markings on said members adjacent and above the normal plane of liquid separation and of the same color as the lighter liquid, said markings including two direction indicating markings of each color, parallel to the plane of liquid separation and at opposite sides of said member, the upper pair of markings pointing inwardly and the lower pair of markings pointing outwardly.

25. A level indicating instrument comprising a housing, a transparent member carried by said housing, and cooperating therewith to define a chamber, two liquids of different colors and different specific gravities in said chamber, a plurality of markings on said member adjacent and below the normal plane of separation of said liquids and of the same color as said heavy liquid, and a plurality of markings on said member adjacent and above the normal plane of liquid separation and of the same color as the lighter liquid, said markings including an upper upwardly-pointing direction indicia and a lower downwardly-pointing direction indicia.

26. A level indicating instrument comprising a chambered housing having a transparent chamber-defining portion, two liquids of different colors and different specific gravities in said housing chamber, a pair of spaced inwardly pointing markings on opposite sides of said transparent portion parallel to and above the normal plane of liquid separation and of the same color as said lighter liquid, and a pair of spaced outwardly pointing markings on opposite sides of said transparent portion parallel to and below the normal plane of liquid separation and of the same color as said heavy liquid.

27. A level indicating instrument comprising a chambered housing having a transparent chamber-defining portion, two liquids of different colors and different specific gravities in said housing chamber, a plurality of direction-indicating markings of the same color as said light liquid arranged on said transparent portion in laterally spaced relation adjacent and above the normal plane of separation of said liquids, and a plurality of direction-indicating markings of the same color as said heavy liquid arranged on said transparent portion in laterally spaced relation adjacent and below the normal plane of separation of said liquids.

28. A level indicating instrument comprising a chambered housing having a transparent chamber-defining portion, a float in said chamber, centrifugally responsive means for shifting said float in said chamber, two liquids of different colors and different specific gravities substantially filling the space in said chamber around said float, and a plurality of markings on said transparent portion adjacent the normal plane of separation of said liquids, each marking being of the same color as the liquid adjacent thereto in the normal position of the instrument.

ARTHUR Z. BENDAR.